US011472983B2

(12) United States Patent
Wang et al.

(10) Patent No.: US 11,472,983 B2
(45) Date of Patent: Oct. 18, 2022

(54) POLYSILOXANE RESIN COMPOSITION

(71) Applicants: DOW GLOBAL TECHNOLOGIES LLC, Midland, MI (US); DOW SILICONES CORPORATION, Midland, MI (US)

(72) Inventors: Linfei Wang, Shanghai (CN); Xiaomei Song, Shanghai (CN); Hongyu Chen, Shanghai (CN); Guodong Shen, Shanghai (CN); Yunlong Guo, Shanghai (CN)

(73) Assignees: DOW GLOBAL TECHNOLOGIES LLC, Midland, MI (US); DOW SILICONES CORPORATION, Midland, MI (US)

( * ) Notice: Subject to any disclaimer, the term of this patent is extended or adjusted under 35 U.S.C. 154(b) by 74 days.

(21) Appl. No.: 17/049,331

(22) PCT Filed: Apr. 27, 2018

(86) PCT No.: PCT/CN2018/084765
§ 371 (c)(1),
(2) Date: Oct. 20, 2020

(87) PCT Pub. No.: WO2019/205078
PCT Pub. Date: Oct. 31, 2019

(65) Prior Publication Data
US 2021/0054204 A1    Feb. 25, 2021

(51) Int. Cl.
| | |
|---|---|
| *C09D 183/10* | (2006.01) |
| *C09D 183/06* | (2006.01) |
| *C08G 59/24* | (2006.01) |
| *C08G 77/24* | (2006.01) |
| *C08G 77/26* | (2006.01) |
| *C08K 3/22* | (2006.01) |
| *C08K 3/36* | (2006.01) |
| *C08K 5/544* | (2006.01) |
| *C08K 5/57* | (2006.01) |
| *C08L 83/06* | (2006.01) |
| *C09D 5/16* | (2006.01) |
| *C08L 83/10* | (2006.01) |

(52) U.S. Cl.
CPC ........ *C09D 183/10* (2013.01); *C08G 59/24* (2013.01); *C08G 77/24* (2013.01); *C08G 77/26* (2013.01); *C08K 3/22* (2013.01); *C08K 3/36* (2013.01); *C08K 5/544* (2013.01); *C08K 5/57* (2013.01); *C08L 83/06* (2013.01); *C08L 83/10* (2013.01); *C09D 5/1675* (2013.01); *C08K 2003/2227* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 4,537,800 | A | 8/1985 | Kuziemka |
| 5,691,019 | A | 11/1997 | Carroll et al. |
| 5,804,616 | A | 9/1998 | Mowrer et al. |
| 5,904,959 | A | 5/1999 | Martin |
| 6,071,990 | A | 6/2000 | Yip et al. |
| 6,440,572 | B1 | 8/2002 | Yokoyama et al. |
| 10,975,262 | B1 * | 4/2021 | Dave .................... C09D 163/00 |
| 2002/0010270 | A1 | 1/2002 | Czech et al. |
| 2002/0077397 | A1 | 6/2002 | Karuga et al. |
| 2007/0092738 | A1 | 4/2007 | Gronlund Scholten et al. |
| 2008/0017070 | A1 | 1/2008 | Prezzi et al. |
| 2009/0281207 | A1 * | 11/2009 | Stratton ............... C09D 183/08 |
| | | | 522/68 |
| 2015/0284592 | A1 * | 10/2015 | Gorun .................... B01J 35/004 |
| | | | 524/88 |
| 2019/0233675 | A1 * | 8/2019 | Chen ....................... F03D 80/00 |

FOREIGN PATENT DOCUMENTS

| | | |
|---|---|---|
| CN | 1246884 A | 3/2000 |
| CN | 102382547 A | 3/2012 |
| CN | 102838931 A | 12/2012 |
| EP | 1849831 B1 | 1/2010 |
| JP | H03259965 A | 11/1991 |
| JP | 10-095953 * | 4/1998 |
| JP | 2003528198 A | 9/2003 |
| WO | 2005033219 A2 | 4/2005 |
| WO | 2017113149 A1 | 7/2017 |

OTHER PUBLICATIONS

Machine translation of JP 10-095953 (no date).*
International Search Report for PCT/CN2018/084765 dated Jan. 30, 2019, 4 pages.
Machine assisted English translation of CN102838931A obtained from https://patents.google.com/patent on Oct. 11, 2021, 7 pages.
Machine assisted English translation of JPH03259965A obtained from https://worldwide.espacenet.com/ on Oct. 12, 2021, 4 pages.
Machine assisted English translation of CN102382547A obtained from https://patents.google.com/patent on Oct. 11, 2021, 7 pages.

* cited by examiner

*Primary Examiner* — Marc S Zimmer
(74) *Attorney, Agent, or Firm* — Warner Norcross + Judd LLP

(57) ABSTRACT

A composition which provides a coating film having excellent foul releasing property is disclosed. The composition comprises, based on the solid contents of the composition: (A) 20 to 80 weight % of a resin which has a polydialkylsiloxane unit and an epoxy resin unit within its structure; (B) 0.1 to 5 weight % of an amino silane; (C) 0.5 to 5 weight % of a hydrophilic additive; and (D) 0.1 to 5 weight % of a catalyst. A coating, e.g. a coating film, formed from the composition generally has an amphiphilic surface. Thus, the composition is suitable for coatings which prevent both hydrophobic and hydrophilic fouling.

13 Claims, No Drawings

POLYSILOXANE RESIN COMPOSITION

CROSS-REFERENCE TO RELATED APPLICATIONS

This application claims priority to and is the National Stage of International Appl. No. PCT/CN2018/084765 filed on 27 Apr. 2018, the content of which is hereby incorporated by reference.

FIELD OF INVENTION

The present invention relates generally to a coating composition which provides a coating having excellent foul releasing property. Especially, the coating formed from the coating composition has an amphiphilic surface thus it is suitable for coatings which prevent both hydrophobic and hydrophilic fouling.

BACKGROUND

Silicone coatings are well known as protective and decorative coatings for metals such as steel or aluminum, glasses and woods. However, silicone coatings are sometimes difficult to bond to substrates because of their excellent release characteristics. To increase the adhesion between silicone coatings and the surface of substrates, epoxy-silicone coatings are disclosed and used, for example, U.S. Pat. Nos. 5,904,959A, 5,691,019A, US20070092738A, U.S. Pat. Nos. 6,071,990A, 6,440,572B, US20080017070A, U.S. Pat. No. 4,537,800A and EP1849831B.

Antifouling coating is a coating to protect the surface of an article from sticking dirt or stain. In some cases, antifouling coating is required to prevent many kind of dirt. For example, drams of washing machines frequently contact with water comprising many materials came from dirty clothes, tap water and detergents. Such materials include; sebum, oils, spilled foods and drinks, surfactants, soil, metals, metal ions and insoluble salts thereof. Such materials adhere outer walls of the drams and cause the growth of bacteria and fungi. Therefore, an antifouling coating to prevent many kind of dirt is highly required.

SUMMARY OF INVENTION

Fouling is normally classified to hydrophobic fouling, hydrophilic fouling and insoluble fouling. The inventors of the invention found that a coating composition which provides a high adherent coating with an amphiphilic surface, so it shows excellent anti-fouling properties against all of hydrophobic fouling, hydrophilic fouling and insoluble fouling.

Therefore, one aspect of the invention relates to a composition comprising, based on the solid contents of the composition, comprising: (A) 20 to 80 weight % of a resin which has polydialkylsiloxane unit and epoxy resin unit within its structure, (B) 0.1 to 5 weight % of an amino silane, (C) 0.5 to 5 weight % of a hydrophilic additive and (D) 0.1 to 5 weight % of a catalyst.

In another aspect, the invention relates to a film formed from the composition disclosed above.

In yet another aspect, the invention relates to an antifouling coating composition comprising, based on the solid contents of the composition, comprising: (A) 20 to 80 weight % of a resin which has polydialkylsiloxane unit and epoxy resin unit within its structure, (B) 0.1 to 5 weight % of an amino silane, (C) 0.5 to 5 weight % of a hydrophilic additive and (D) 0.1 to 5 weight % of a catalyst.

DETAILED DESCRIPTION OF EMBODIMENTS

The composition of the invention comprises at least four components: (A) a resin which has polydialkylsiloxane unit and epoxy resin unit within its structure, (B) an amino silane, (C) a hydrophilic additive and (D) a catalyst.

(A) Resin Having Polydialkylsiloxane Unit and Epoxy Resin Unit within its Structure The resin used for the invention has polydialkylsiloxane unit and epoxy resin unit within its structure. It is called as 'epoxy-polysiloxane resin' or 'epoxy-polysiloxane hybrid resin'. Preferably, polydialkylsiloxane unit is $-(SiR^1R^2O)_n-$, wherein $R^1$ and $R^2$ are independently selected from alkyl group having 1 to 4 carbon atoms. More preferably, both $R^1$ and $R^2$ are methyl group. Preferably, n is a number from 10 to 100, more preferably n is a number from 20 to 50.

Epoxy resin unit has at least two epoxy groups. Preferably, epoxy resin unit comprises an aliphatic hydrocarbon group having 5 to 10 carbon atoms.

The weight ratio of polydialkylsiloxane unit and epoxy resin unit is preferably from 5:1 to 1:5, more preferably from 2:1 to 1:2.

The viscosity of the resin is preferably 2,000-5,000 centistokes, more preferably 2,500-4,500 centistokes. The molecular weight of the resin is preferably from 1,000 to 10,000, more preferably from 1,000 to 3,000.

The amount of the resin in the composition is from 20 to 80 weight %, preferably from 50 to 80 weight % based on the weight of the solid contents of the composition.

The resin is publicly available such as epoxy-polysiloxane resin, or it can be synthesized from epoxy and polysiloxane resin. The synthesis of the resin can be conducted during the curing step of the composition.

(B) Amino Silane

Amino silane used for the invention is a silane having at least one amino group, and represented by the following general formula (1):

$$(R^3)_a(OR^4)_{3-a}\text{Si}(CH_2)_b\text{NHR}^5 \qquad (1)$$

In the formula (1), $R^3$ and $R^4$ are monovalent hydrocarbon groups having 1 to 8 carbon atoms. a is a number from 0 to 3 and b is a number from 1 to 10. $R^5$ is selected from the group consisting of hydrogen, a monovalent hydrocarbon group having 1 to 4 carbon atoms, $-(CH_2)_c\text{NHR}^6$ and $-(CH_2)_d\text{Si}(R^7)_e(OR^8)_{3-e}$, in which $R^6$ is selected from hydrogen and a monovalent hydrocarbon group having 1 to 4 carbon atoms, $R^7$ and $R^8$ are monovalent hydrocarbon groups having 1 to 8 carbon atoms.

Examples of monovalent hydrocarbon groups include, but are not limited to, methyl, ethyl, propyl, butyl, hexyl, octyl, vinyl, allyl, isopropenyl, phenyl, benzyl, and 1-phenylprop-2-vinyl.

Examples of amino silane used for the invention include, but are not limited to, $(C_2H_5O)_3\text{Si}(CH_2)_3\text{NH}_2$, 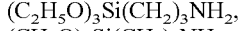
$(CH_3O)_3\text{Si}(CH_2)_3\text{NH}_2$, 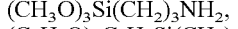
$(C_2H_5O)_2C_6H_5\text{Si}(CH_2)_3\text{NH}_2$, 
$(C_2H_5O)_2CH_3\text{Si}(CH_2)_3\text{NH}_2$, 
$(CH_3O)_3\text{Si}(CH_2)_3\text{NH}(CH_2)_2\text{NH}_2$, 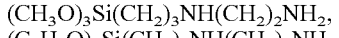
$(C_2H_5O)_3\text{Si}(CH_2)_3\text{NH}(CH_2)_2\text{NH}_2$, 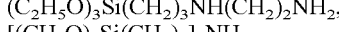
$[(CH_3O)_3\text{Si}(CH_2)_3]_2\text{NH}$, 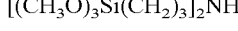

(CH₃O)₂CH₃Si(CH₂)₃NH(CH₂)₂NH₂
(CH₃O)₂CH₃Si(CH₂)₂C(CH₃)₂CH₂NH₂ and
(CH₃O)₂CH₃SiCH₂CH(CH₃) CH₂NH(CH₂).

Amino silane works as a hardener and reacts with epoxy-polysiloxane hybrid resin disclosed as Component (A). Amino group of the amino silane can react with epoxy group of epoxy-polysiloxane hybrid resin. Silicon alkoxyl group of the amino silane can react (by hydrolysis and condensation reaction) with silanol and silicon alkoxyl group of epoxy-polysiloxane hybrid resin under moisture condition.

The amount of amino silane in the composition is from 10 to 30 weight %, preferably from 15 to 20 weight % based on the weight of the solid contents of the composition.

(C) Hydrophilic Additive

Hydrophilic additive used for the invention is a compound which provides hydrophilicity to the film formed from the composition. Examples of hydrophilic additive include, but are not limited to, silicone polyether fluid (SPE) which contains polyethylene glycol (PEG) structure, fluoroalkoxy substituted methyl silicate polymer which is known as a silicate polymer, hydrophilic silica sol and aluminum sol. Hydrophilic additive is preferably fluoroalkoxy substituted methyl silicate polymer.

Hydrophilic additive should partially locate the surface of a coating film to form hydrophilic parts on the surface. Preferably, hydrophilic additive migrates to the surface of the film during curing step of the composition as described later. Especially, fluoroalkoxy substituted methyl silicate polymer is preferable as hydrophilic additive. It is considered that fluoroalkoxy substituted methyl silicate polymer can migrate to the surface of the composition because of its low surface energy property from fluoroalkoxy groups, and locate the surface of the film. Then the fluoroalkoxy groups could be hydrolyzed under moisture condition and form silanol groups. The silanol groups generated by hydrolysis reaction could impart a partial hydrophilic surface of the film.

The amount of hydrophilic additive in the composition is from 1 to 10 weight %, preferably from 2 to 5 weight % based on the weight of the solid contents of the composition.

(D) Catalyst

Catalyst used for the invention is a catalyst for the reaction between the resin (Component (A)) and amino silane (Component (B)). Any known catalyst can be used. Examples of such catalyst include, but are not limited to, Tin compound such as dibutyltin dilaurate, zirconium compound such as zirconium octoate and zirconium acetate, titanium compound such as titanium (IV) butoxide and zinc compound such as zinc octoate and zinc acetate.

The amount of catalyst in the composition should be sufficient to primarily promote the reaction between Component (A) and Component (B), but typically is from 500 to 4,000 ppm, preferably from 1,000 to 3,000 ppm as a metal, based on the weight of the solid contents of the coating composition.

Other Ingredients

The composition of the invention can include other ingredients such as solvent, filler, dispersant, defoamer, surfactant, silicone fluid, wetting agent and dye, these are known to those skilled in the art. When the composition comprises a solvent, any solvent such as alcohols, esters, ethers, ketones, ether-alcohols, aromatic hydrocarbons, aliphatic hydrocarbons, halogenated hydrocarbons and volatile silicones can be used. The amount of solvent in the composition can be from 20 to 80 weight %, preferably from 30 to 50 weight % based on the weight of the total composition.

Article and Film

The composition can be applied on an article and form a film at least a part of the surface of the article by curing of the composition. When applying the composition on an article, variety of techniques can be used such as splaying, brushing roller, dip coating, spin coating, wire coating and the like. Then, typically the article is heated to cure the composition on the surface of the article. Conditions such as temperature or heating time are vary and are known to those skilled in the art, but are exemplarily, 120 to 180 degrees C. for 60 to 120 minutes. Thickness of the film is preferably from 5 to 20 micrometers, more preferably from 5 to 15 micrometers. Examples of the use of the composition include, but are not limited to, coatings for drams of washing machines and internal surface of washing machines including washing machine tripods, coatings for kitchen sink and outer wall of vessel.

The film formed from the composition shows excellent anti-fouling properties against all of hydrophobic fouling, hydrophilic fouling and insoluble fouling. Also, the film has good anti-corrosion and protection of articles, good transparency and good adhesion to an article. While not being bound by theory, it is considered that epoxy resin units of epoxy-polysiloxane hybrid resin locate the bottom of the film (near the surface of an article) and contribute good adhesion between the surface of an article and the film, as well as good anti-corrosion of an article. At the same time, polydialkylsiloxane units of epoxy-polysiloxane hybrid resin locate the surface of the film and contribute good fouling release property, especially against hard fouling. In addition, hydrophilic additive partially locates on the surface of the film and contributes good fouling release property against oily fouling.

EXAMPLES

The raw materials disclosed in Table 1 were used to prepare samples in Examples.

TABLE 1

Raw materials

| Material Type | Description | Supplier |
|---|---|---|
| A-1 | Epoxy polysiloxane resin | Evonik Industries AG |
| A-2 | Cycloaliphatic epoxy resin | DAICEL Corporation |
| B-1 | Amino terminated silicone resin | Dow Corning |
| B-2 | Aminopropyltriethoxysilane | Dow Corning |
| C-1 | Fluoroalkoxyl substituted methyl silicate polymer | Dow Corning |
| C-2 | Methyl polysiloxane resin | Dow Corning |
| D-1 | Dimethyltin dineodecanoate | Dow Corning |
| Solvent | Xylene | Aldrich |
| Solvent | n-butyl acetate | Aldrich |

Examples

Weighed the raw materials according to specific formulations in Table 4, homogeneously mixed by shaking for 30 minutes. 0.6 ml solution was blade coated on aluminum panel and cured at 120° C. for 2 hours. Dry film thickness was detected after fully cured and their pencil hardness were evaluated and listed in Table 4. The results of adhesion after boiling water test and antifouling performance ranking results were also listed in Table 4.

<Analytical Method>

(1) Coating Durability Test Method (Boiling Water Resistance Test)

Put the coated panels into water tank with boiling water, 8 hours as 1 cycle, after each cycle, took out the panels and laid for 16 hours at room temperature and recorded coating appearance, then continued another cycle until coating failure or totally accumulated to 500 hours, stopped the test. Observed coating appearance and tested coating adhesion according to Cross hatch tape test ASTM D3359-02.

(2) Salt Spray Resistance Test

Salt spray resistance test was conducted according to ASTM D714-02. 5% NaCl salt water was sprayed on the test samples. The result (rust grade) was classified as disclosed in Table 2.

TABLE 2

Rust grade of salt spray resistance test

| Rust Grade | Percent of surface rusted | Visual Examples | | |
|---|---|---|---|---|
| | | Spot(s) | General(G) | Pinpoint(P) |
| 10 | Less than or equal to 0.01 percent | | | |
| 9 | Greater than 0.01 percent and up to 0.03 percent | 9-S | 9-G | 9-P |
| 8 | Greater than 0.03 percent and up to 0.1 percent | 8-S | 8-G | 8-P |
| 7 | Greater than 0.1 percent and up to 0.3 percent | 7-S | 7-G | 7-P |
| 6 | Greater than 0.3 percent and up to 1.0 percent | 6-S | 6-G | 6-P |
| 5 | Greater than 0.01 percent and up to 0.03 percent | 5-S | 5-G | 5-P |
| 4 | Greater than 3.0 percent and up to 10.0 percent | 4-S | 4-G | 4-P |
| 3 | Greater than 10.0 percent and up to 16.0 percent | 3-S | 3-G | 3-P |
| 2 | Greater than 16.0 percent and up to 33.0 percent | 2-S | 2-G | 2-P |
| 1 | Greater than 33.0 percent and up to 50.0 percent | 1-S | 1-G | 1-P |
| 0 | Greater than 50.0 percent | | None | |

(3) Anti-Fouling Performance Test (3-1) Foul Preparation

The liquid foul is prepared according to China's standard GB/T13174 entitled "Determination of detergency and cycle of washing property for laundry detergents".

Oil component was prepared by heating and mixing together 30 g of palmitic acid, 15 g of stearic acid, 45 g of coconut oil, 30 g of liquid paraffin, 60 g of olive oil, 15 g of cholesterol and 45 g of cotton oil acid. Inorganic component was prepared by mixing 2.5 g of carbon black, 1 g of $Fe_2O_3$, 44.5 g of clay soil, 3.8 of arabic gum, 10 ml of alcohol and 115 ml of water in mortar and grinding it for 30 minutes. Mixed 4.8 g of triethanolamine, 2.4 g of oleic acid, 10.2 g of inorganic component, 60 ml of oil component and 600 ml of water. Kept the mixture at 60 degrees C. and stirred with 3000 rpm for 1 h. Then the foul was prepared.

(3-2) Dirty Water Preparation

Cut towel (3M™ microfiber cleaning cloth) into 3 cm×10 cm pieces and dip each piece into the liquid foul prepared in (3-1). Then put the dirty towel in oven at 80 degrees C. for 2 hours. Each piece absorbed 3.0±0.1 g dried foul. Dissolved 3 g of laundry detergent (Bluemoon™) into 1 L of water, and washed 3 pieces of dirty towels in the detergent solution by hand. Diluted the left dirty water to 30% concentration. The desired dirty water was prepared.

(3-3) Test Sample Preparation

Prepared a piece of PTFE tape of 40 cm×40 cm. Cut a circle with 38 cm diameter and keep the frame. Pasted the tape frame onto the sample surface. The circle center locates at the ⅓ position to the sample's bottom. Dropped 1.5 ml of dirty water prepared in (3-2) in the circle. Made the water cover all the circle area. Put the sample in fume hood over 12 hours to evaporate all the water. Then the test sample is prepared.

(3-4). Washing Test

Dissolved 1.5 g of laundry detergent (Bluemoon™) into 3 L of water in a 5 L of bucket. Hang 5 samples at the same time along the bucket wall and kept the dirt region immersed into the detergent solution. Placed a stirrer in the center of the bucket. The rotor should locate at the same height of the dirt. Started the stirring with 250 rpm. After 15 minutes, stopped stirring and calculated the residual percentage of dirt (by eye). Took note of the cleaned area percent. Then put the samples back and increase to 500 rpm for 15 minutes. Repeat the operations. Then repeat for 750 rpm and 1,000 rpm. Only 5 minutes for 1,000 rpm. Took photos for each stage. The whole washing time was 50 minutes. After finishing washing, put samples aside and let the residual water evaporate. When there's no water, give a rank of the removal capability of the sample; The removal capability is the sum of removal percentage in 4 stages, in the range of from 0 to 400. The final anti-fouling performance is the sum of removal percentage in 4 stages.

TABLE 3

Anti-fouling performance evaluation method

| | Stage 1 (Removal percentage %) | Stage 2 (Removal percentage %) | Stage 3 (Removal percentage %) | Stage 4 (Removal percentage %) | Total score |
|---|---|---|---|---|---|
| Sample ID | 250 rpm 15 min | 500 rpm 15 min | 750 rpm 15 min | 1000 rpm 5 min | 1 cycle: 50 min |
| Example sample | A % | B % | C % | D % | A + B + C + D |

Examples and Results

TABLE 4

High anti-fouling performance coating formulations and results

| Hard coating | Comparative Examples | | |
|---|---|---|---|
| | 1 | 2 | 3 |
| A-1 | — | — | 10 |
| A-2 | — | — | — |
| C-2 | — | 10 | — |
| B-1 | — | — | — |
| C-1 | — | — | — |
| B-2 | — | — | 2.4 |
| n-butyl acetate (solvent) | — | — | — |
| D-1 | — | — | 0.026 |
| Xylene (solvent) | — | — | 4 |
| Substrate | AL-46 | AL-46 | AL-46 |
| Curing temperature/° C. | — | 200 | 120 |
| Curing time/h | — | 1.0 | 2.0 |
| film thickness (dry)/μm | — | 15 | 15 |
| Boiling water resistance/h | — | 200 | >500 |
| Failure mode | — | Peel off | NA |
| Antifouling performance | 40 | 79 | 50 |
| Salt spray resistance (5% NaCl, 1000 h) | 0 | 2 | 8 |

TABLE 4

High anti-fouling performance coating formulations and results (cont.)

| | Inventive Examples | | | | | | | |
|---|---|---|---|---|---|---|---|---|
| Hard coating | 1 | 2 | 3 | 4 | 5 | 6 | 7 | 8 |
| A-1 | 4.75 | 4.75 | 4.75 | 4.75 | 4.75 | — | — | — |
| A-2 | — | — | — | — | — | 3 | 3 | 3 |
| C-2 | — | — | — | — | — | — | — | — |
| B-1 | 2.75 | — | — | — | — | 3 | 3 | 3 |
| C-1 | 0.25 | 0.08 | 0.24 | 0.65 | 0.7 | 0.32 | 0.83 | 1.32 |
| B-2 | — | 1.2 | 1.2 | 1.2 | 1.2 | 1.55 | 1.55 | 1.55 |
| n-butyl acetate (solvent) | 7.5 | 5.75 | 5.75 | 5.75 | 5.75 | 14.0 | 14.0 | 14.0 |
| D-1 | 0.06 | 0.06 | 0.06 | 0.06 | 0.06 | 0.11 | 0.11 | 0.11 |
| Xylene (solvent) | — | — | — | — | — | — | — | — |
| Substrate | AL-46 | AL-46 | AL-46 | AL-46 | AL-46 | AL-46 | AL-46 | AL-46 |
| Curing temperature/° C. | 120 | 120 | 120 | 120 | 120 | 120 | 120 | 120 |
| Curing time/h | 2.0 | 2.0 | 2.0 | 2.0 | 2.0 | 2.0 | 2.0 | 2.0 |
| film thickness (dry)/μm | 15 | 15 | 15 | 15 | 15 | 15 | 15 | 15 |
| Boiling water resistance/h | >500 | >500 | >500 | >500 | >500 | >500 | >500 | >500 |
| Failure mode | NA | NA | NA | NA | NA | NA | NA | NA |
| Antifouling performance | 117 | 140 | 305 | 220 | 240 | 175 | 230 | 230 |
| Salt spray resistance (5% NaCl, 1000 h) | 8 | 8 | 8 | 8 | 8 | 8 | 8 | 8 |

As seen from Table 4, all the coatings can have good adhesion to metal substrate and they all have good anti-corrosion performance. All the coating appearance and coating color are transparent. This benefit from methyl polysiloxane resin, which unique structure is very stable under high temperature. The silicone fluid component in the hybrid resin tends to migrate to the surface due to the surface energy driving force, which will can potentially form kind of amphiphilic surface with hydrophilic additives to provide anti-fouling performance, while epoxy will provide good adhesion to the substrate or prime coating. The loading of hydrophilic additive also impact the anti-fouling performance (Inventive Examples 1-8). Polysiloxane coating or epoxy coating do not have good antifouling performance individually. (Comparative Examples 2 and 3).

What is claimed is:

1. A composition comprising:
   (A) 20 to 80 weight % of an epoxy-polysiloxane resin which has a polydialkylsiloxane unit and an epoxy resin unit within its structure, wherein the epoxy resin unit has at least two epoxy groups comprising an aliphatic hydrocarbon group having 5 to 10 carbon atoms and the polydialkylsiloxane unit is of the general formula:

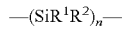
   —(SiR$^1$R$^2$)$_n$— where R$^1$ and R$^2$ are independently selected from alkyl groups having 1 to 4 carbon atoms and n is a number from 10 to 100;
   (B) 0.1 to 5 weight % of an amino silane represented by the following general formula (1):

   (R$^3$)$_a$(OR$^4$)$_{3-a}$Si(CH$_2$)$_b$NHR$^5$tm(1)

where R$^3$ and R$^4$ are monovalent hydrocarbon groups having 1 to 8 carbon atoms, a is a number from 0 to 3 and b is a number from 1 to 10, R$^5$ is selected from the group consisting of hydrogen, a monovalent hydrocarbon group having 1 to 4 carbon atoms, —(CH$_2$)$_c$NHR$^6$, and —(CH$_2$)$_d$Si(R$^7$)$_e$(OR$^8$)$_{3-e}$, in which R$^6$ is selected from hydrogen and a monovalent hydrocarbon group having 1 to 4 carbon atoms, R$^7$ and R$^8$ are monovalent hydrocarbon groups having 1 to 8 carbon atoms, c and d are numbers from 1 to 10, and e is a number from 0 to 3;
   (C) 0.5 to 5 weight % of an additive selected from the group consisting of a silicone polyether fluid, a fluoroalkoxy substituted methyl silicate polymer, a hydrophilic silica sol, a hydrophilic aluminum sol, and combinations thereof; and
   (D) 0.1 to 5 weight % of a catalyst;
   each weight % based on the solid contents of the composition.

2. The composition of claim 1, wherein the epoxy resin unit in the epoxy-polysiloxane resin (A) is an aliphatic epoxy resin.

3. The composition of claim 1, wherein the polydialkylsiloxane unit in the epoxy-polysiloxane resin (A) comprises a polydimethylsiloxane.

4. The composition of claim 1, wherein the weight ratio of the polydialkylsiloxane unit and the epoxy resin unit within the epoxy-polysiloxane resin (A) is from 5:1 to 1:5.

5. The composition of claim 1, wherein: i) R$^1$ and R$^2$ are methyl groups; ii) n is number from 20 to 50; or iii) both i) and ii).

6. A film formed from the composition of claim 1.

7. The film of claim 6, wherein the film is formed on an article selected from the group consisting of drums of washing machines, internal surfaces of washing machines, washing machine tripods, kitchen sinks, and combinations thereof.

8. The composition of claim 1, further defined as an anti-fouling coating composition.

9. The composition of claim 2, wherein the polydialkylsiloxane unit in the epoxy-polysiloxane resin (A) comprises a polydimethylsiloxane.

10. The composition of claim 9, wherein the weight ratio of the polydialkylsiloxane unit and the epoxy resin unit within the epoxy-polysiloxane resin (A) is from 5:1 to 1:5.

11. The composition of claim 10, wherein the weight ratio of the polydialkylsiloxane unit and the epoxy resin unit within the epoxy-polysiloxane resin (A) is from 2:1 to 1:2.

12. The composition of claim 1, wherein the epoxy-polysiloxane resin (A) has: i) a viscosity of from 2,000-5,000 centistokes, or optionally a viscosity of from 2,500-4,500 centistokes; ii) a molecular weight of from 1,000 to 10,000, or optionally a molecular weight of from 1,000 to 3,000; or iii) both i) and ii).

13. The composition of claim 1, wherein the amino silane (B) is at least one selected from the group consisting of $(C_2H_5O)_3Si(CH_2)_3NH_2$, $(CH_3O)_3Si(CH_2)_3NH_2$, $(C_2H_5O)_2C_6H_5Si(CH_2)_3NH_2$, $(C_2H_5O)_2CH_3Si(CH_2)_3NH_2$, $(CH_3O)_3Si(CH_2)_3NH(CH_2)_2NH_2$, $(C_2H_5O)_3Si(CH_2)_3NH(CH_2)_2NH_2$, $[(CH_3O)_3Si(CH_2)_3]_2NH$, $(CH_3O)_2CH_3Si(CH_2)_3NH(CH_2)_2NH_2$, $(CH_3O)_2CH_3Si(CH_2)_2C(CH_3)_2CH_2NH_2$, and $(CH_3O)_2CH_3SiCH_2CH(CH_3)CH_2NH(CH_2)$.

* * * * *